United States Patent [19]
Beachum et al.

[11] Patent Number: 5,824,897
[45] Date of Patent: *Oct. 20, 1998

[54] BLADE STATIC BALANCING FIXTURE

[75] Inventors: Norman L. Beachum, Foristell; Joseph T. Buckel; James Qin, both of Chesterfield; Charles I. Clark, Florissant, all of Mo.

[73] Assignee: Avion, Inc., Bridgeton, Mo.

[ * ] Notice: This patent issued on a continued prosecution application filed under 37 CFR 1.53(d), and is subject to the twenty year patent term provisions of 35 U.S.C. 154(a)(2).

[21] Appl. No.: 700,736

[22] Filed: Aug. 15, 1996

[51] Int. Cl.$^6$ .................................................. G01M 1/12
[52] U.S. Cl. ................................................. 73/456; 73/66
[58] Field of Search ............................ 73/456, 455, 462, 73/65.1, 66; 416/144, 145, 19, 61

[56] References Cited

U.S. PATENT DOCUMENTS

| | | | |
|---|---|---|---|
| 1,880,313 | 10/1932 | Charavay | 73/456 |
| 2,388,705 | 11/1945 | Reiber | 73/456 |
| 3,148,545 | 9/1964 | Freeman | 73/456 |
| 4,078,422 | 3/1978 | Brunsch et al. | 73/456 |
| 4,991,437 | 2/1991 | Hanchett | 73/455 |
| 5,475,622 | 12/1995 | Reinfelder et al. | 73/456 |

*Primary Examiner*—Christine K. Oda
*Attorney, Agent, or Firm*—Blackwell Sanders Peper Martin

[57] ABSTRACT

The invention discloses a helicopter rotor blade static balancing fixture. First, the blade is rooted to provide a basis for accurate station or spanwise measurements. Then, weight information is measured by the load cells, and the distance from the weight measurement to the leading edge of the blade is measured by linear transducers, respectively, and communicated to a computer. The computer calculates the spanwise moment, compares the calculated value to the factory standard spanwise moment, and calculates and displays a recommended weight adjustment. The computer calculates the chordwise moment, compares the calculated value to the factory standard chordwise moment, and calculates and displays a recommended weight adjustment.

14 Claims, 7 Drawing Sheets

BLADE STATIC BALANCING FIXTURE

BACKGROUND OF THE INVENTION

1. Field of the Invention

This invention relates to balancing blades and, in particular, to statically balancing aircraft rotor blades.

2. Related Art

Factory specifications of helicopter rotor blades and tail rotor blades provide a standard fixed value for each part number blade. Helicopter blades are made from composites of fiberglass and carbon fiber and generally weigh in the neighborhood of 250 to 355 lbs each. Tail rotor blades weigh between 10 and 20 lbs each. Generally, for a helicopter to fly reliably, each helicopter blade must have substantially similar spanwise and chordwise moments. Accordingly, it is not unusual for a set of helicopter blades to be required to fall within a very close spanwise and chordwise moment tolerance.

Weight distributions, and thus the spanwise and chordwise moment, on composite rotor blades have a tendency to change over time. During the refurbishment of helicopters returning from the Desert Storm war, maintenance test pilots and crew chiefs experienced extremely long calendar and flight times needed to track and balance the helicopter blades of repaired aircraft. It was discovered by the inventors that weight distributions on rotor blades changed dramatically over time due to various factors such as water ingestion, wear and erosion from particulates such as sand, repairs, and additional weight introduced by repainting of the blades.

When rotor blades become unmatched in spanwise moment, a vibration is transmitted to the remainder of the helicopter. Because vibrations from unmatched rotor blades are significant contributors to airframe fatigue and dynamic component wear, it is critical that the rotor blades be matched in sets, and preferable to predetermined engineering values.

Because the spanwise moment of each rotor blade is significant, but the relative tolerance required among rotor blades is slight, balancing helicopter rotor blade spanwise moments is a difficult task. In the field, balancing is accomplished by trial and error. Specifically, rotor blades are mixed and matched until a set of rotor blades is found by chance to be close together in spanwise moment. To match sets of rotor blades, field units have recorded taking weeks, sometimes hundreds of man hours, and up to 40 flight hours.

Once a matched set of rotor blades is discovered, the field can successfully dynamically balance the rotor blades as a set. This is an extremely inefficient and ineffective method of balancing especially when a rotor blade or rotor blades have experienced significant changes in weight distribution.

If a rotor blade is passed from aircraft to aircraft without finding compliment blades, the rotor blade is transported back to a depot or the prime manufacturer for overhaul. Transporting these rotor blades can be extremely costly and difficult, given that the weight of each rotor blade is often distributed over a length which exceeds 20 feet.

At a depot, a rotor blade is balanced by using a teeter balance which is similar in concept to two children playing on a teeter-totter or see-saw. Specifically, a master rotor blade is used as a standard on one side of the teeter balance and the rotor blade to be balanced is placed on the other side of the teeter balance. Weights are added to or removed from the rotor blade being balanced in order that the moments between the balancing rotor blade and the master rotor blade, respectively, will equalize.

Similarly, most prime manufacturers use some type of teeter balance and master rotor blade to accomplish balancing and assure the interchangeability of rotor blades. After the static balance has been accomplished, some manufacturers dynamically test the rotor blade on a whirl tower.

One alternative to the teeter balance discovered prior to the filing of the present application is electronically weighing used at the Army Depot in Corpus Christi, Tex. In simple terms, a rotor blade is laid across three electronic weight scales. The weight scales are permanent in nature, and not portable. With the weight of each scale noted, written tables are utilized to determine weight adjustments. Then, weight measurements are taken again to assure correct adjustment of the blade. This system is used to balance only one type of rotor blade, the Kaman Rotor Blade. Accordingly, this electronic scale approach is known as the Kaman Machine. However, this approach cannot be used in the field because of a lack of portability.

Teeter balancers, whirl towers, and master rotor blades are prohibitively expensive for field use. The only two Kaman machines built are meant to be used only in a depot on Kaman Blades.

Accordingly, there is a clear need in the art to provide a fixture of moderate cost and simple operation which can be used at field and intermediate field maintenance levels to balance varied models of helicopter rotor blades without having to keep a stock of master rotor blades.

There is a further need in the art to enable fast balancing of a rotor blade in the field to prevent the cost of shipping and then commercially overhauling rotor blades.

There is also a need in the art to allow the field to balance and match rotor blades while taking only two or three flights and consuming less than two flight hours.

SUMMARY OF THE INVENTION

The invention discloses a helicopter rotor blade static balancing fixture which comprises a root end assembly, a plurality of load cells, and a plurality of linear transducers. First, the blade is rooted to provide a basis for accurate station or spanwise measurements. Then, weight information is measured by the load cells, and the distance from the weight measurement to the leading edge of the blade is measured by linear transducers, respectively, and communicated to a computer. The computer calculates the spanwise moment, compares the calculated value to the factory standard spanwise moment, and calculates and displays a recommended weight adjustment. The computer calculates the chordwise moment, compares the calculated value to the factory standard chordwise moment, and calculates and displays a recommended weight adjustment.

The present invention is adaptable to accommodate different blade geometries.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
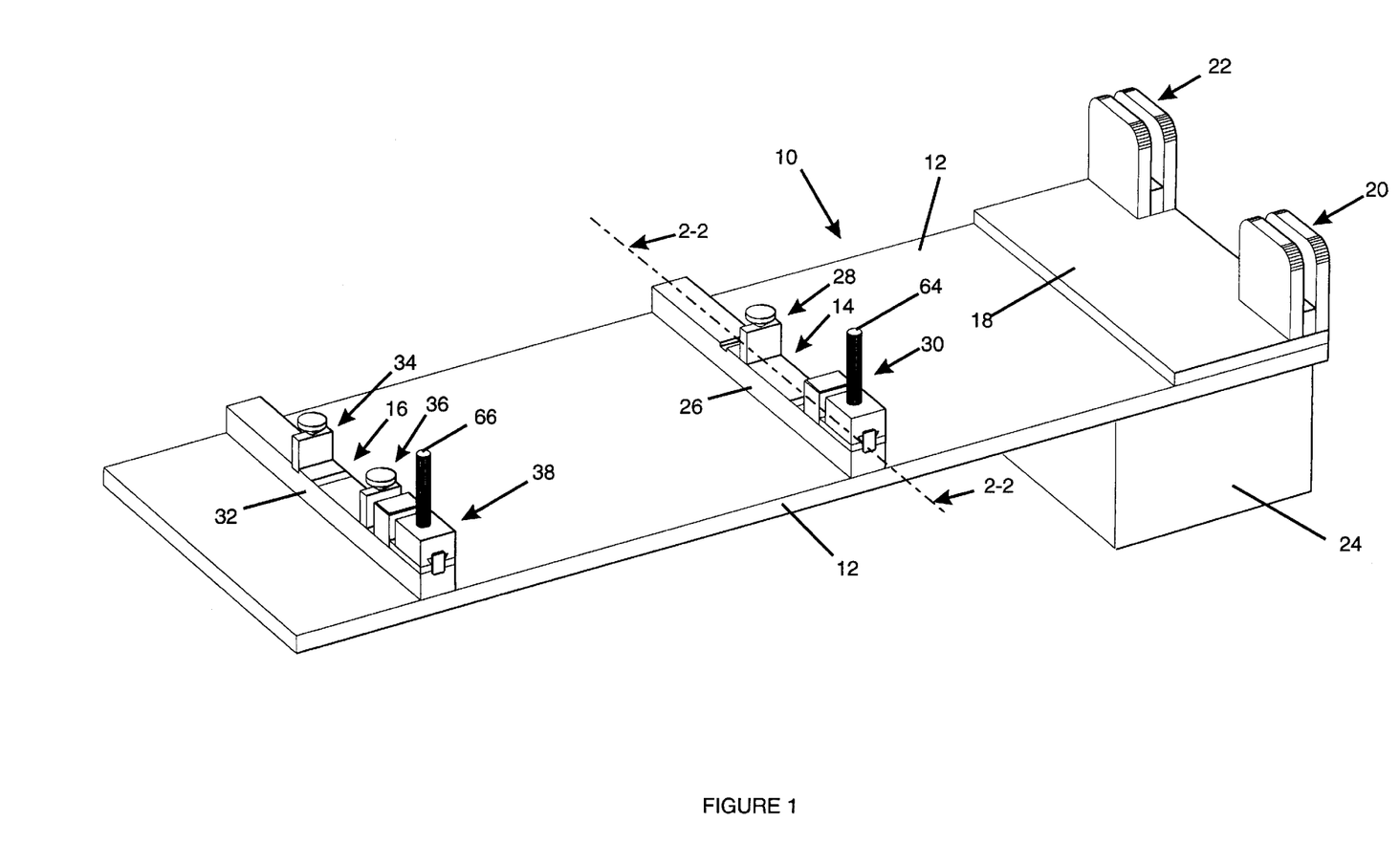
FIG. 1 illustrates a perspective view of a first embodiment of the present invention.

Referring to the accompanying drawings in which like reference numbers indicate like elements, FIG. 1 illustrates a perspective view of a first embodiment of the present invention in which a helicopter rotor blade, preferably not a helicopter tail rotor blade, may be statically balanced.

A blade static balancing fixture is shown generally at 10. Blade static balancing fixture 10 comprises first base 12, first mounting bar assembly shown generally at 14, second mounting bar assembly shown generally at 16, second base 18, first root assembly 20, second root assembly 22, and computer 24.

First base 12 as illustrated is similar in appearance to an elongated table top. Preferably, first base 12 is assembled in sections (not shown) for ease of portability. Preferably, first base 12 may be constructed from sections of triangular radio tower truss. A truss construction has the advantage of being cheap, lighter than a solid surface table top, and readily available commercially.

Figure 2:
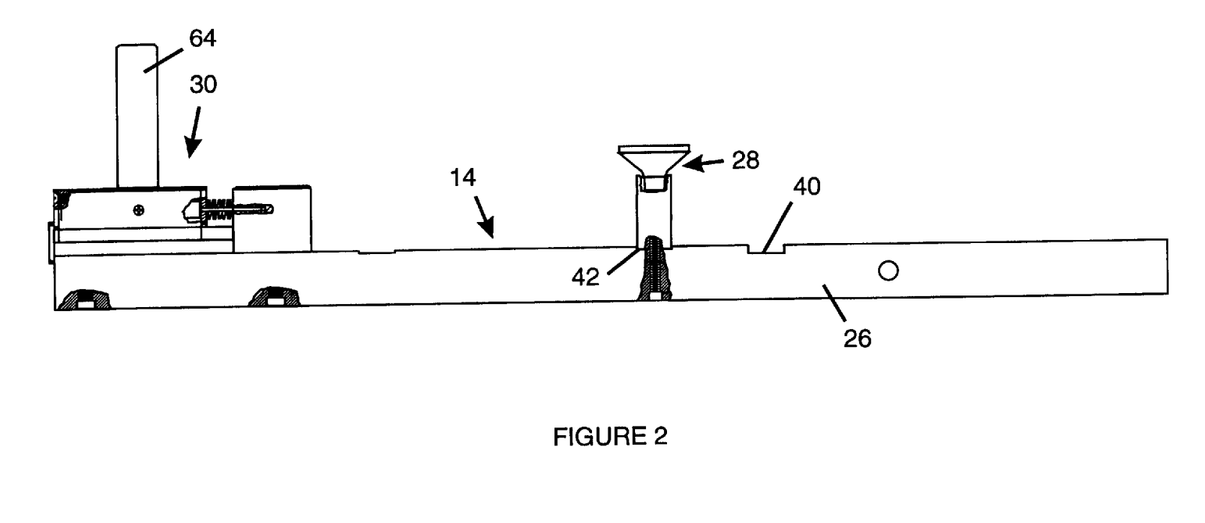
FIG. 2 illustrates a cutaway view of a mounting bar assembly of the present invention initially indicated along line 2—2 in FIG. 1.

First mounting bar assembly 14 as shown in FIGS. 1 and 2 comprises first mounting bar 26, first load cell assembly shown generally at 28, and first linear transducer assembly shown generally at 30 which is preferably a linear variable digital transducer.

All load cell assemblies discussed throughout this application are well-known in the art, including the electronic wiring schematics associated therewith, and may be obtained generically from a wide range of manufacturers. Accordingly, the performance characteristics of any load cell assembly is more important than the identity of the manufacturer. Preferably, any load cell assembly has capacity of 130% to 200% of the expected load, has an overall accuracy of better than 0.05% FS full scale, has a linearity of better than 0.02%, has a repeatability of 0.02%, has a temperature operating range of between 15 and 115 degrees fahrenheit, and has overload characteristics of more than 150% FS full scale. Based on these characteristics, there are many well-known manufacturers of such assemblies, including by way of example but not limitation, Eaton Corp. located in Southfield, Mich.

Similarly, all linear transducer assemblies discussed throughout this application are well-known in the art, including the electronic wiring schematics associated therewith, and may be obtained generically from a wide range of manufacturers. Accordingly, the performance characteristics of any linear transducer assembly is more important than the identity of the manufacturer. Preferably, any linear transducer assembly that has a total travel greater or equal to 1 inch, has an operating temperature range of between 15 and 115 degrees fahrenheit, has a linearity error of less then 0.1%, and has an infinite resolution rating. Based on these characteristics, there are many well-known manufacturers of such assemblies, including by way of example but not limitation, Data Instruments, located in Acton, Mass.

As illustrated in cut-away portions of FIG. 2, first load cell assembly 28 and first linear transducer assembly 30 are mounted on first mounting bar 26. All linear transducer assemblies, including first linear transducer assembly 30, are housed in a machined block that slides on an interlocking machined bed. As illustrated in FIG. 2, the transducer block is spring-loaded to an initial reference position. Pushing the block against the spring activates first transducer assembly 30 which causes it to measure the distance traveled (pushed). Various grooves 40 and 42 may be machined into second mounting bar 32. These grooves serve to adjust the height of first load cell assembly 28, pending on the depth of the groove and whether first load cell assembly 28 is placed within a particular groove. By adjusting the height of any load cell assembly 28, the blade is held or supported in a certain position and a certain orientation. Blade manufacturers specify standard reference angles at which standard spanwise and chordwise values are provided. By manipulating the height of all of the load cell assemblies, the proper blade reference angle may be achieved. It is noted that different blade models will require different depth of groove requirements.

Second mounting bar assembly 16 comprises second mounting bar 32, second load cell assembly shown generally at 34 mounted on second mounting bar 32, third load cell assembly shown generally at 36 mounted on second mounting bar 32, and second linear transducer assembly (preferably a linear variable digital transducer) shown generally at 38 mounted on second mounting bar 32.

Figure 3A:
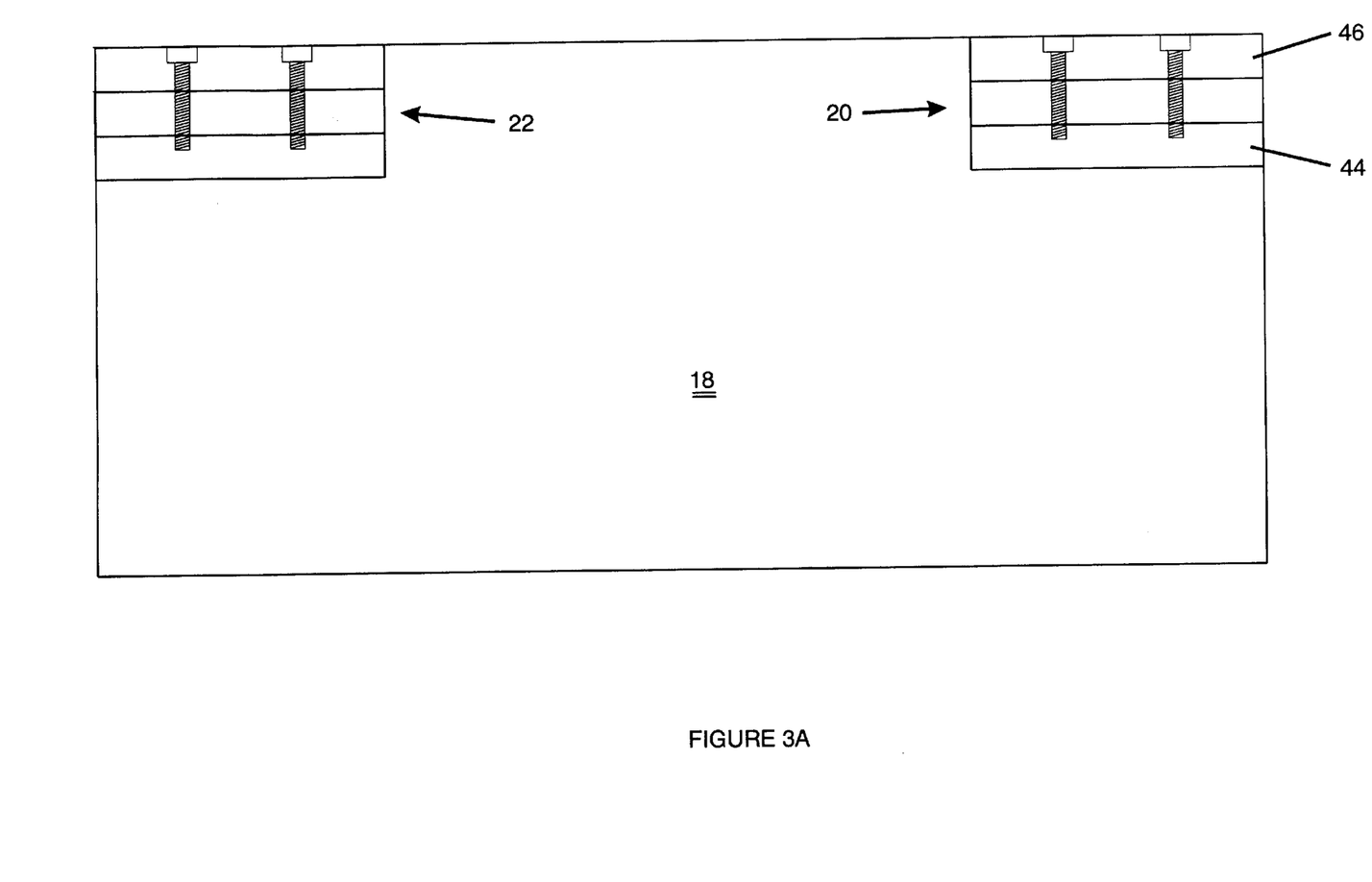
FIG. 3a illustrates a top plan view of the root end plate assembly of the present invention.
Figure 3B:
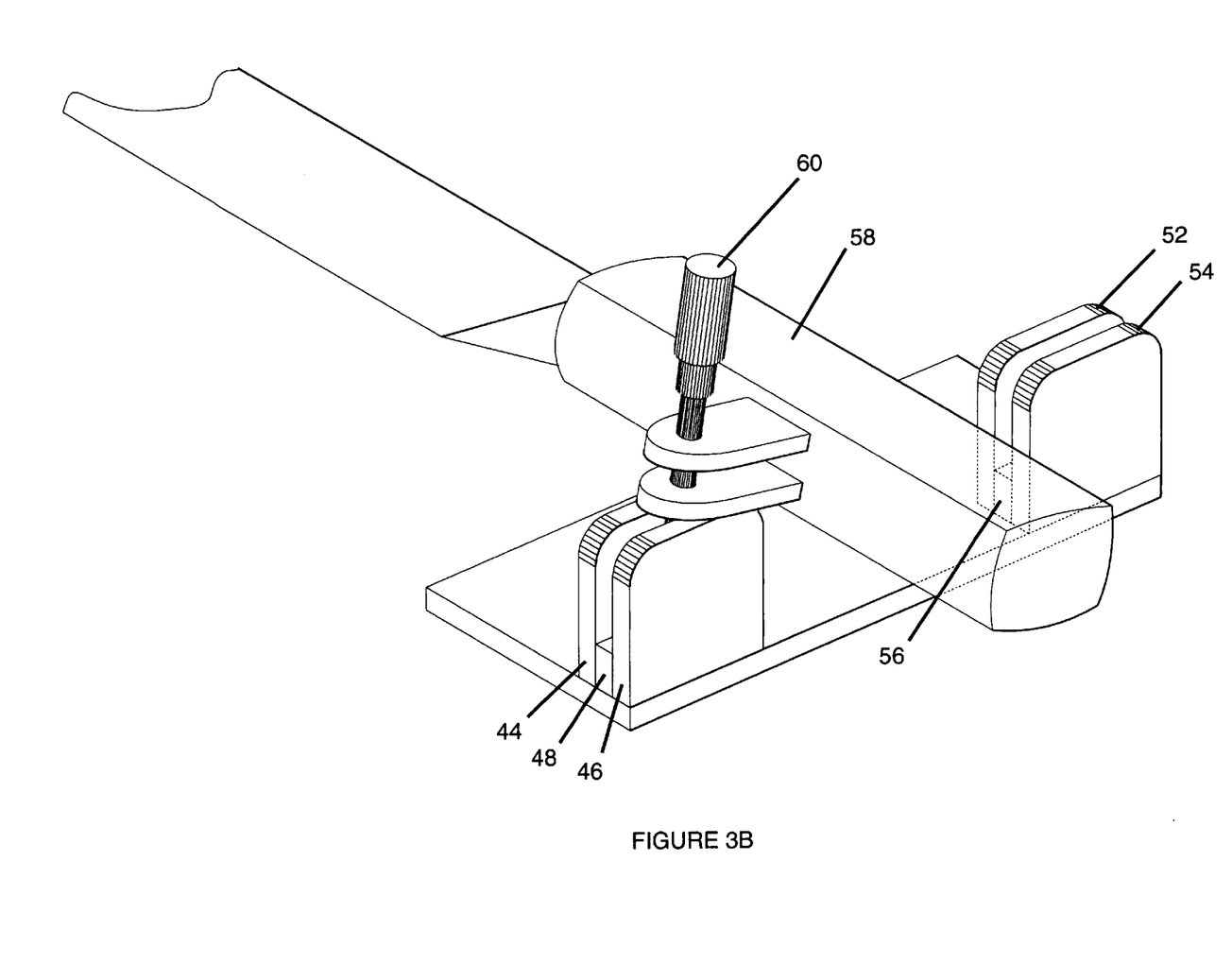
FIG. 3b illustrates a perspective view of the root end plate assembly portion of the first embodiment of the present invention in operation.

Referring now to FIGS. 1, 3a and 3b, second base 18 is mounted on first base 12. First and second root assemblies 20-22 are mounted on second base 18. First root assembly 20 comprises first outer member 44, and second outer member 46 spaced apart by spacer element 48. Similarly, second root assembly has first outer member 52 and second outer member 54 spaced apart by spacer element 56.

The purpose of blade static balancing fixture 10 is to calculate the span and chord moments of a particular blade and display the recommended weight adjustment, if applicable. In order to calculate the moments of any particular blade, accurate measures of weight and location of weight measurement are critical. For optimal accuracy, at least three points of measurement are necessary.

In operation, a root point (alternatively termed an "origin" point or an "indexing" point) must be established spanwise (lengthwise along the blade) from which all distances are measured. Accordingly, in FIG. 3b, a root pin 60 is inserted through blade 58, and specifically inserted through the blade aperture through which blade 58 is normally attached to the helicopter. Root pin 60 then is fit between first outer member 44 and second outer member 46 of first root assembly 20. For opposite direction turning blades, blade 58 is brought to rest against first outer member 52 and second outer member 54 of second root assembly 22, and preferably against the side of outer members 44–46 which face first root assembly 20.

In this manner, the spanwise length has a reliable and consistent root, or zero, from which spanwise length measurements may be made. As an obvious corollary, the diameter of root pin 60 must be substantially equivalent to the width of spacer elements 48 and 56, and also substantially equivalent to the inside diameter of the blade aperture. Because blade apertures will necessarily vary, depending on the blade model and helicopter model, various dimensions for first and second root assemblies 20–22 may be provided on second base 18. It is therefore contemplated that various different bases may be employed as second base 18, depending on the blade model being balanced. However, regardless of which second base 18 is employed, its position for mounting on first base 12 is fixed, thereby allowing the root point to remain identical.

As blade 58 is rooted via root pin 60, the remainder of blade 58 is set across first, second, and third load cell assemblies 28, 34, and 36, respectively. Then, first and second linear transducer assemblies 30 and 38, respectively, are moved such that pins 64 and 66 are placed in contact against the outer or leading edge of blade 58.

Because the load cell assemblies 28, 34, and 36, and the linear transducer assemblies 30 and 38, are electronic, a digital weight measurement for each load cell and a digital distance measurement for each linear transducer is taken and communicated to computer 24. Each load cell assembly, 28, 34, and 36, and each linear transducer assembly, 30 and 38, is individually directly connected to computer 24. The initial distance between first load cell assembly 28 and first linear transducer assembly 30 is a known fixed distance. After the remainder of blade 58 is placed on first load cell assembly 28, pin 64 is pushed into contact with the outer edge of blade 58. When this happens, a distance measurement is taken to identify the travel length chordwise of pin 64. Because the original chordwise distance between load cell assembly 28 and pin 64 is known, use of linear transducer assembly 30 permits an exact chordwise distance measurement from first load cell assembly 28 to the outer edge of blade 58. Accordingly, these two measurements being known, the chord moment of blade 58 at the point of weighing may be calculated by computer 24. Similarly, weight and distance measurements may be taken for second and third load cell assemblies 34 and 36, and second linear transducer assembly 38.

Figure 4:
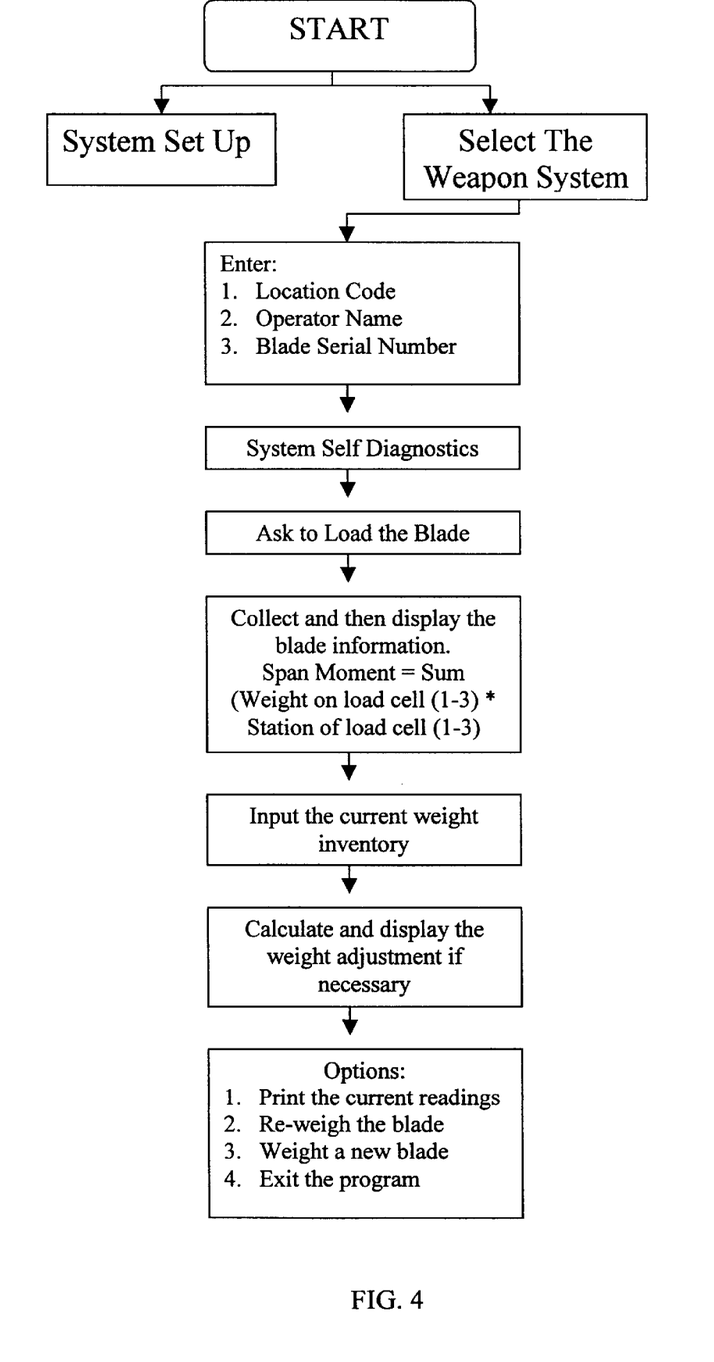
FIG. 4 illustrates a software flow chart for receiving and evaluating data received from the load cells and linear variable digital transducer of the present invention.

As shown more particularly in FIG. 4, the weight and distance information is processed by computer 24 as follows. The span moment is calculated in particular, the weight measurement of first load cell assembly 28 is multiplied by the distance from root (or "station" as is termed in the art); the weight from second load cell assembly 34 is multiplied by the distance from root (or "station"); and the weight from third load cell assembly 36 is likewise multiplied by the station measurement. Because the location of mounting bars 26 and 32 is fixed in advance, the station measurements are fixed values known in advance. Next, each of these three products are summed (added) to arrive at the span moment value.

Because the factory specifications for span moment are known, computer 24 compares the factory span moment against the calculated span moment of the blade 58 being measured, to calculate the difference between span moments. As is well-known in the art, weight adjustments are added to the outer tip (not shown) of blade 58. Accordingly, computer 24 can solve for the magnitude of weight adjustment necessary by taking the difference in span moments calculated earlier and dividing this difference by the length or station (known based upon blade model) at which the weight is applied. As shown in the flow chart of FIG. 4, the magnitude of the weight adjustment is displayed for the user.

Similarly, the chord moment may be calculated by multiplying the weight measurement by the distance from the location of weight measurement to the leading edge of rotor blade 58. This calculation is repeated for the three weighing locations and each of the three products are summed to arrive at the chord moment value.

In a manner virtually identical to the calculation for span moment, computer 24 solves for the magnitude of weight adjustment necessary, after comparing the factory chord moment against the calculated chord moment. It is well-known in the art that chordwise weight adjustments are made possible by the manufacturer's placing movable weights within blade 58. The field will then manipulate these movable weights by adding or subtracting weight to the fore or aft of the center gravity of blade 58.

Figure 5:
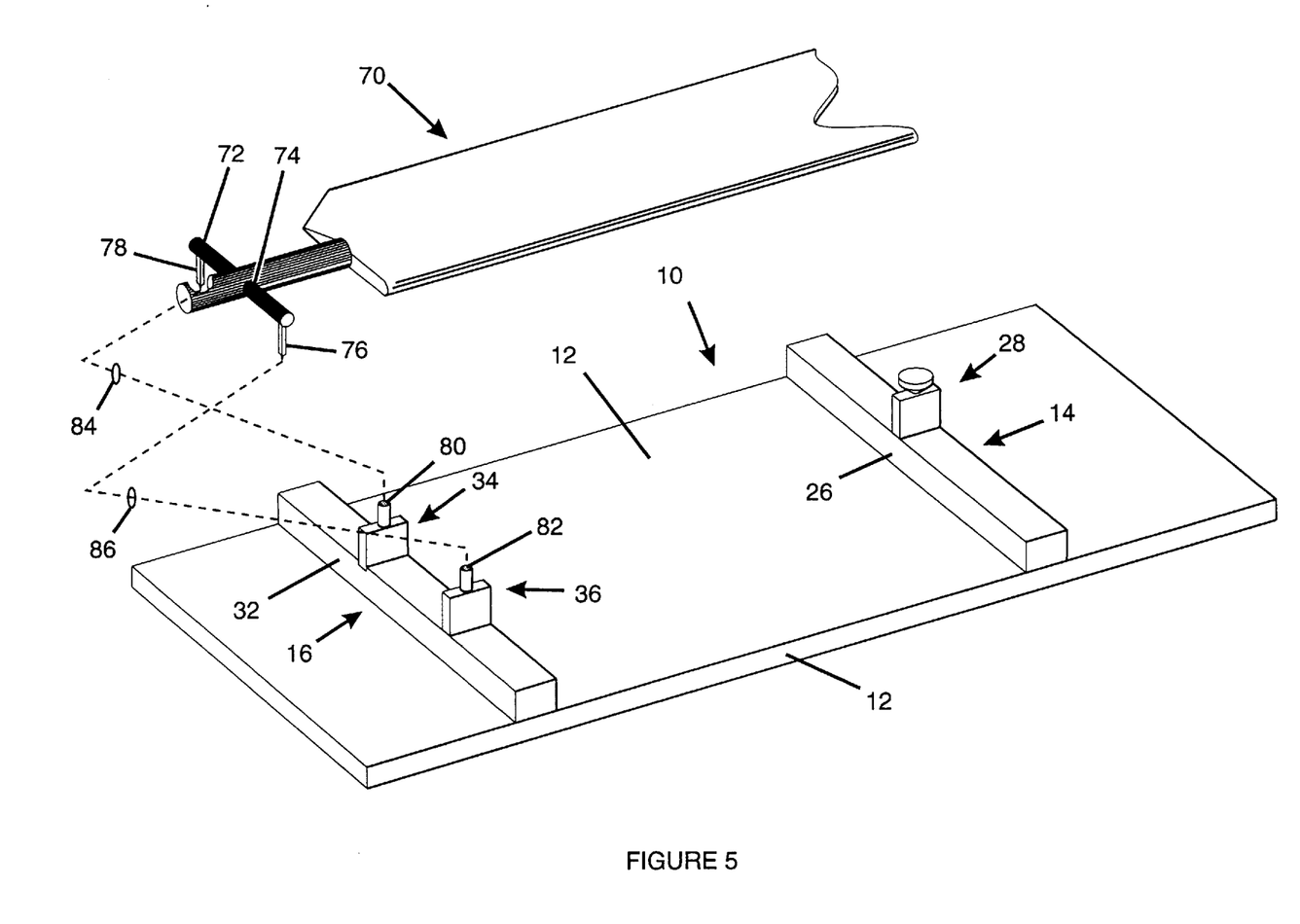
FIG. 5 illustrates an alternate embodiment of the present invention which may be used to balance tail rotor blades.

In keeping with the spirit of this invention, certain modifications may be made, depending upon the rotor blade geometry. For example, an alternate rotor blade geometry is shown in FIG. 5. Tail rotor blade 70 has a different blade geometry than conventional main rotor blades. In particular, a single root pin 60 will not allow for proper rooting. In this case, a second root pin 72 is extended through aperture 74 and tail rotor blade 70. After placement of second root pin 72, first centering tip 76 and second centering tip 78 are screwed into second root pin 72 which is tapped (not shown). Second load cell assembly 34 is provided with a precision indentation guide 82 for receiving first centering tip 76. Similarly, third load cell assembly 36 is provided with a precision indentation guide 80 for receiving second centering tip 78. As lines 84 and 86 indicate, tail rotor blade 70 may be set on one end on second mounting bar assembly 16 and on the other end, on first mounting bar assembly 14 (and on first load cell assembly 28, in particular). First and second centering tips 76–78, together with precision indentation guides 82–80, assure an accurate weight measurement from a normal orientation. Because linear distances in this example are already known, there is no need for linear transducer measurements. The span moment may be calculated using the weight measurements from the first, second, and third load cell assemblies 28, 34, and 36, respectively, together with the known stations in the same manner as explained above. Accordingly, computer 24 may also calculate a recommended weight adjustment, if applicable.

Figure 6:
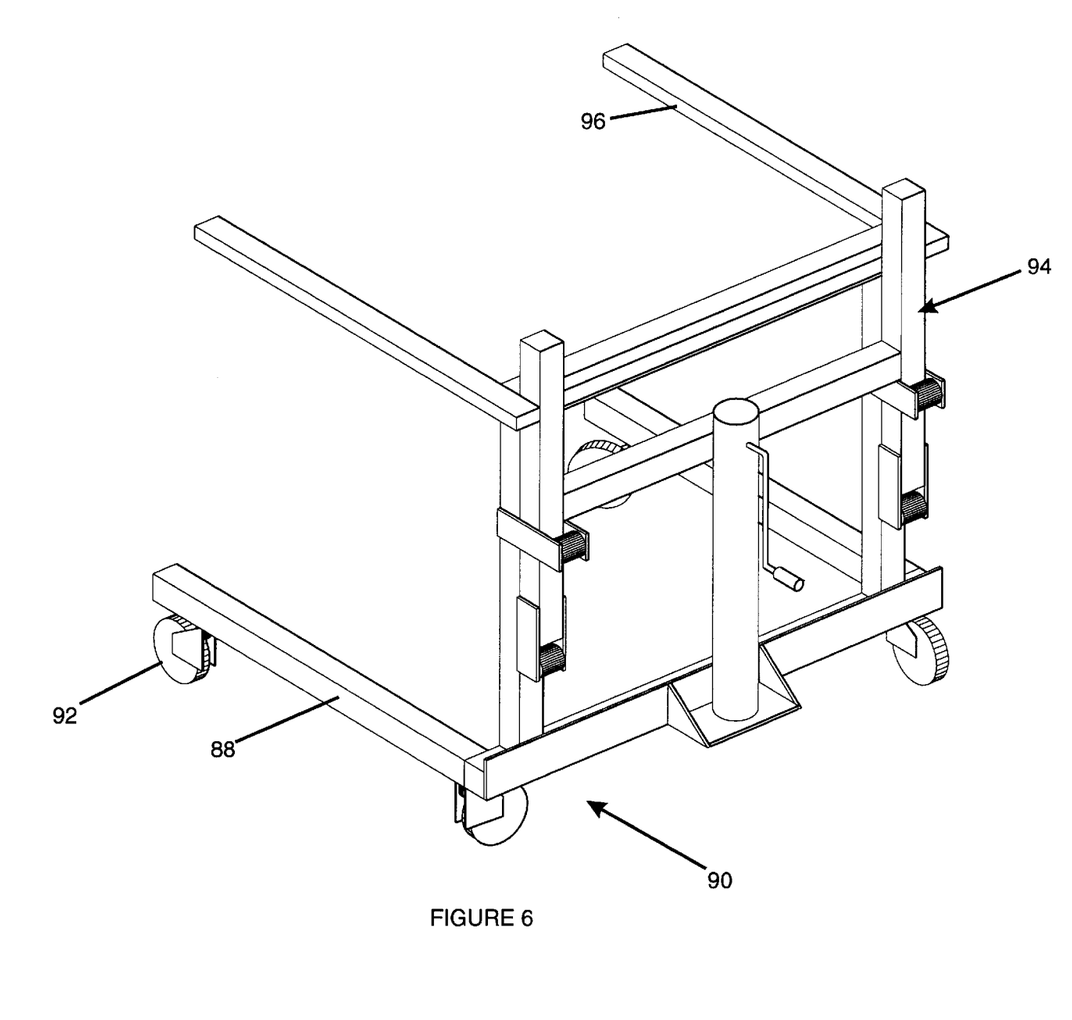
FIG. 6 illustrates a perspective view of a blade lifter used in conjunction with the present invention.

Referring now to FIG. 6, a blade lifter 90 is illustrated. Blade lifter 90 is any device which may be used to assist in lifting and lowering blades. Because it is necessary to precisely load blade 58 in the correct position without shock loading the load cells, a mechanism such as blade lifter 90 is needed in lieu of less accurate manual positioning. In fact, due to the size and weight of some large blades, the inventors have found that it is impossible to place blade 58 in the proper position on blade static balancing fixture 10 without blade lifter 90. In a preferred embodiment as illustrated, blade lifter 90 has a lifter base 88 connected to moving means shown generally at 88. Moving means may comprise wheels 92 or any other rolling means. Connected to lifter base 88 is vertical moving means 94, which may comprise rack and pinion, hydraulic, pneumatic, mechanical jack, or the like. Lifter blade support 96 is connected to vertical moving means shown generally at 94. In operation, blade lifter 90 operates in a manner similar to that of a forklift. In particular, blade 58 is placed on lifter blade support 96. Then, blade lifter 90 is moved (pushed) via moving means to the proper vertical position as determined by the locations of the load cells and the linear transducers.

It is noted that the proper position is in part dictated by the limitations of the measuring devices. For example, if the linear transducers have a maximum travel distance of ¼ inch, the proper position of blade 58 must result in having the linear transducer travel less than ¼ inch to the leading edge of blade 58. Once the proper position is found, vertical moving means lowers lifter blade support 96, thereby lowering blade 58 onto blade static balancing fixture 10.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, the locations of first and second mounting bar assemblies 14–16 may be reversed. In another example, it should be emphasized that a linear digital transducer is only one of a class of the digital position sensors encompassed by this invention. In other words, the linear digital transducer may be replaced by any other type of digital position sensor such as a photo, laser, or sonic type. Linear digital transducers were the optimum choice in the example system because the blade geometry consisted of a straight leading edge. However, other types of digital position sensors such as photo, laser, or sonic would be more appropriate where the blade geometry is something other than a straight leading edge. In all cases, the purpose of the digital position sensor is to enable measurement of the distance between the outer blade edge and the point of weight measurement. Thus, the breadth and scope of the present invention should not be limited by any of the above-described exemplary embodiments, but should be defined only in accordance with the following claims appended hereto and their equivalents.

What is claimed is:

1. A blade static balance fixture comprising:
   a base;
   a rooting pin connected to said base;
   a triangular arrangement of only three load cell assemblies carried by said base; and
   a first digital position sensor connected to said base;
   whereby said three load cell assemblies measure blade weight and said first digital position sensor measures blade position relative to said rooting pins to enable span moments and chord moments to be calculated by blade weight and digital position at only three points determined by said load cell assemblies.

2. A blade static balance fixture according to claim 1, wherein said base is oriented horizontally with one side providing a horizontal frame for receiving said three load cell assemblies and said first digital position sensor.

3. A blade static balance fixture according to claim 1, further comprising a first bar disposed on said base, wherein two of said three load cell assemblies are mounted on said first bar.

4. A blade static balance fixture according to claim 3, further comprising a second bar disposed on said base, wherein the third of said three load cell assemblies is mounted on said second bar.

5. A blade static balance fixture according to claim 1, further comprising a first bar disposed on said base, wherein said first digital position sensor is mounted on said first bar.

6. A blade static balance fixture according to claim 5, further comprising:
   a second bar disposed on said base; and
   a second digital position sensor mounted on said second bar.

7. A blade static balance fixture according to claim 1, further comprising:
   a first bar disposed on said base, wherein two of said three load cell assemblies are mounted on said first bar and wherein said first digital position sensor is mounted on said first bar;
   a second bar disposed on said base;
   a second digital position sensor;
   wherein the third of said three load cell assemblies is mounted on said second bar and wherein said second digital position sensor is mounted on said second bar.

8. A blade static balance fixture according to claim 7, wherein each of the digital position sensors is constituted by a respective linear digital voltage transducer.

9. A blade static balance fixture according to claim 1, further comprising:
   a second base element disposed on said base;
   a pin disposed through said blade and in contact with said second base element;
   whereby said pin indexes said blade spanwise.

10. A method of statically balancing blades comprising:
    (a) placing a blade on a static balance fixture;
    (b) fixing a spanwise length zero position with respect to said blade;
    (c) then weighing said blade at three locations triangularly arranged;
    (d) simultaneously measuring the spanwise length of said blade at three locations;
    (e) then calculating the spanwise moment value of said blade with a computer by communicating to the computer for each of the three locations three sets of weight and distance information, using the computer to determine a product of weight and distance of each of said three locations, and then summing each of these three products to arrive at the spanwise moment value;
    (f) then comprising said calculated spanwise moment value against a standard spanwise moment value;
    (g) then calculating the magnitude of a weight adjustment to bring said calculated spanwise moment value closer to said standard spanwise moment value.

11. A method of statically balancing blades according to claim 10, wherein the step of placing a blade on a static balance fixture is accomplished by using a blade lifter to place said blade.

12. A method of statically balancing blades according to claim 10, wherein the step of fixing a spanwise length zero position with respect to said blade comprises the step of placing a pin through a portion of said blade.

13. A method of statically balancing blades comprising:
    (a) placing a blade on a static balance fixture;

(b) fixing a spanwise length zero position with respect to said blade;

(c) then weighing said blade at three locations triangularly arranged;

(d) measuring the distance from each location to the leading edge of said blade;

(e) communicating the weight and distance information to a computer for each of the three locations so as to provide three sets of weight and distance information;

(f) then calculating the chordwise moment value of said blade with a computer by determining a product of weight and distance of each of said three locations, and then summing each of these three products to arrive at the chordwise moment value;

(g) then comparing said calculated chordwise moment value against a standard chordwise moment value;

(h) then calculating the magnitude of a weight adjustment to bring said calculated chordwise moment value closer to said standard chordwise moment value.

14. A method of statically balancing blades according to claim 13, wherein the step of placing a blade on a static balance fixture is accomplished by using a blade lifter to place said blade.

* * * * *

UNITED STATES PATENT AND TRADEMARK OFFICE
CERTIFICATE OF CORRECTION

PATENT NO. : 5,824,897
DATED : October 20, 1998
INVENTOR(S) : Beachum et al.

It is certified that error appears in the above-indentified patent and that said Letters Patent is hereby corrected as shown below:

IN THE CLAIMS:

Claim 1, column 7, line 51, delete "pins" and insert instead --pin--; and

Claim 10, column 8, line 48, delete "comprising" and insert instead --comparing--.

Signed and Sealed this

Sixteenth Day of March, 1999

Attest:

Q. TODD DICKINSON

*Attesting Officer*     *Acting Commissioner of Patents and Trademarks*